N. B. CREGIER.
TELEGRAPH REGISTER RECEIVING APPARATUS.
APPLICATION FILED FEB. 11, 1918.
1,378,011.
Patented May 17, 1921.
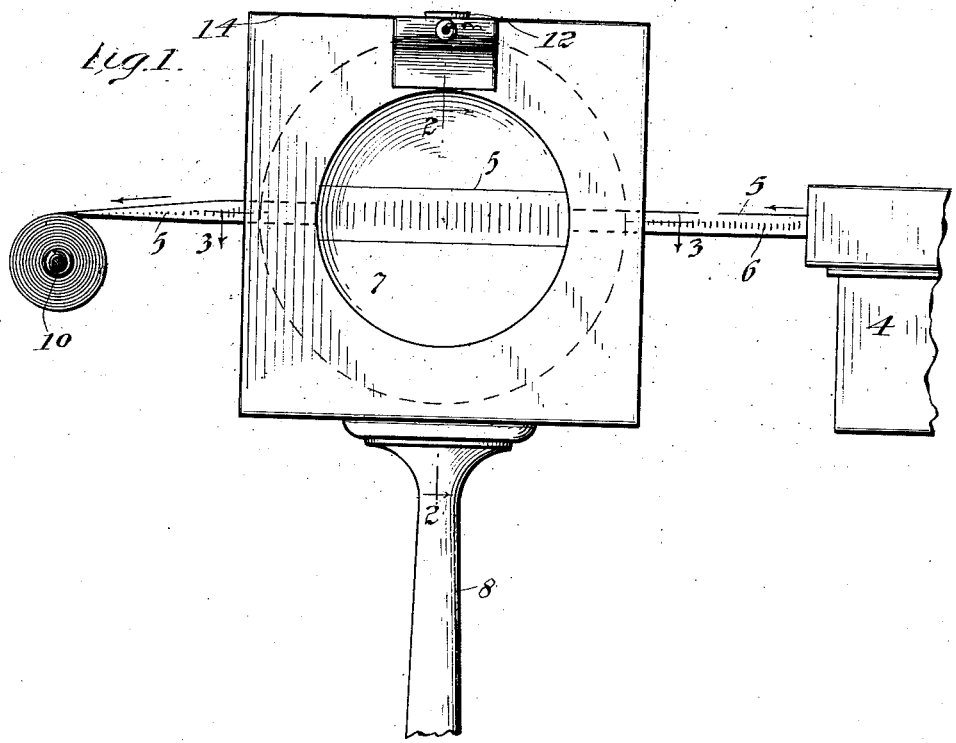
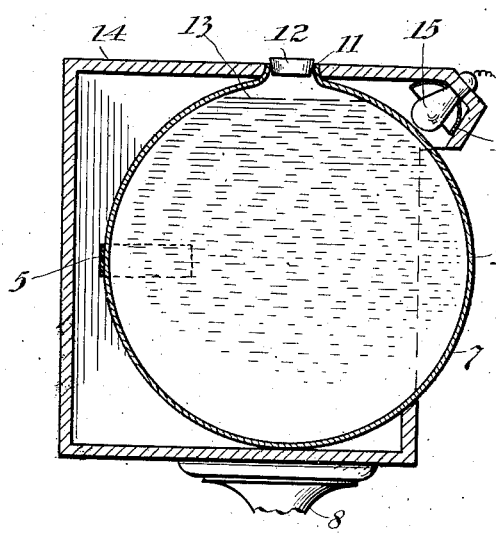
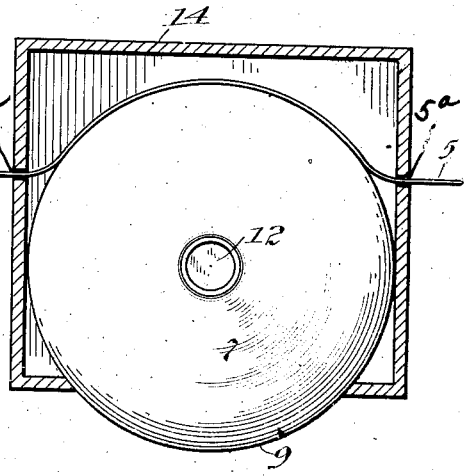

UNITED STATES PATENT OFFICE.

NATHANIEL B. CREGIER, OF CHICAGO, ILLINOIS.

TELEGRAPH REGISTER RECEIVING APPARATUS.

1,378,011. Specification of Letters Patent. Patented May 17, 1921.

Application filed February 11, 1918. Serial No. 216,588.

*To all whom it may concern:*

Be it known that I, NATHANIEL B. CREGIER, a citizen of the United States, and a resident of the city of Chicago, in the county of Cook and State of Illinois, have invented certain new and useful Improvements in Telegraph Register Receiving Apparatus, of which the following is a full, clear, and exact specification.

This invention relates to improvements in telegraph register receiving apparatus for reporting and displaying telegraphed market and other news, and comprising among other things a paper tape, automatically conducted through the apparatus, and upon which at frequent intervals market reports and other news telegraphed from a source or sources distant therefrom are printed in type characters, heretofore visible only at the usual reading distance from the tape, and but by a single observer, located in the immediate vicinity of the ticker, and in the meantime to the exclusion of others who may be present, and to whom the information disclosed by such reports is of as great or greater importance.

It is the common practice amoug brokers, bankers, and others, to have installed in their private offices such an apparatus, commonly called a "ticker", for keeping in close touch with the markets, and for which purpose the ticker is usually so located that the broker or banker, as may be, must bodily turn from his desk work, and, more frequently, step from his chair many times during the day, before he can locate himself within a reading distance of the tape, and this to the neglect, for the time being, of other business matters of importance, requiring his personal attention, and which are accordingly delayed, with the result that he must frequently work overtime in order to avoid a loss possible from such neglect.

Heretofore, a black board installed in an office set apart by brokers, has been the only means for simultaneously displaying market reports to a number of their patrons, and for which end one or more trained attendants must be employed who, after tearing off a small piece of the printed strip discharging from the printing register, necessarily shift their position thence to the black board, and while holding the strip in one hand, display upon the board by manual operation, the printed news, in characters large enough to be read from any point in the room in which the black board is located.

This black board method is obviously objectionable, because of the lapse of time necessarily occurring between the receipt of the market report by the ticker, and its display to patrons having a financial interest therein, and this especially during a rapid fluctuation in market prices, when it is impossible for the markers to keep up with the ticker, with the result that patrons not only suffer, through the additional lost time, a nervous strain from excitement and anxiety, but not infrequently a financial loss in their operations.

The object of my invention, broadly stated, is to provide a telegraph receiving register apparatus with means so constructed and arranged that the typewritten characters upon the passing paper tape are automatically made visible and readable with certain accuracy in substantially less time than heretofore, and from any point in front thereof, in a room in which the ticker may be located.

Another object of my invention is to provide a means by which market reports upon tape for and in the immediate vicinity of a ticker are visible unmistakably at a distance substantially away from the ticker, concurrently with the passage of the tape therefrom, and, therefore, within the shortest possible time after the printing of telegraphed market reports and other news appearing upon such tape.

Another object of my invention is not only to provide a means for automatically displaying printed matter upon the tape of a ticker to practically an unlimited number of observers in front of the tape, but when located at any angle relative thereto.

A further object of my invention is to provide a "take-up" for maintaining the tape flat and taut against and throughout its passage across the lens for magnifying the printed matter thereon, and which is also adapted for re-winding the tape either for filing, or subsequent use, immediately following the display of the printed news thereon in magnified form.

With these ends in view, my invention finds its embodiment in certain features of novelty in the construction, combination, and arrangement of parts, by which the said objects and certain other objects are obtained, as herein fully described with reference to the accompanying drawings, and more particularly to the claims.

In said drawings:

Figure 1 is a front elevation of an electrical market reporting apparatus, in which my invention finds its embodiment;

Fig. 2 is a vertical section taken on the line 2—2 of Fig. 1, and

Fig. 3 is a horizontal section taken on the line 3—3 of Fig. 1.

In carrying out my invention I employ a ticker device indicated at 4, of any construction now commonly employed, or which may be adapted for the printing of telegraphed market reports and other news on a paper tape 5, as heretofore, and for discharging the tape therefrom progressively with the printing thereon.

Located in the path of the paper tape 5, passing from the ticker, and as close to the latter as is practicable, is a magnifying means 7, mounted upon a stand 8, and inclosed in a casing 14, having one side open, through which to expose a substantial portion of the surface 9 of the magnifying means, through which to expose the printed characters upon the tape 5, in its passage across and preferably with its surface in close contact with the magnifying means, and which may be conducted along a path formed by a groove depressed in the surface or attached to the magnifying means.

The tape may be conducted across the surface of the magnifying means by any suitable means, but preferably by a reel shaft 10, provided with either a spring, weight, or other suitable means adapted for causing the tape to automatically move concurrently with the releasing of the tape from the ticker.

For compelling the printed surface of the tape to assume reading position, flatly opposed to the surface of the magnifying means, in its passage from the ticker across the magnifying means, the tape must be twisted to give a quarter turn before passing to and from the magnifying means, and while any suitable means may be employed for this purpose, it is found in practice that vertically arranged registering slots, 5ᵃ—5ᵃ, for guiding the tape through the opposite sides of the casing, as indicated in Fig. 3, will serve to produce the desired result.

The magnifying means may consist of many kinds of the well-known lenses of solid glass, or any form of receptacle of glass, containing a transparent liquid, but in practice preferably consists of a glass globe adapted to contain water or other liquid, suitable for the purposes of my invention, introduced through an opening 11, provided with a removable stopper 12, the level of the liquid therein being above the range of vision of observers, as indicated at 13.

As compared with solid glass lens and other forms of liquid lens, a spherical liquid lens is seemingly best adapted for the purposes of my invention, because much cheaper of construction in larger sizes than is solid glass lens; that as compared with other forms of liquid lens, it has greater strength for resisting liquid pressure without breaking, and that by reason of its form, a spherical lens of given size presents a focal surface adapted to simultaneously magnify a tape and the printed matter thereon, of a length greater than is possible with the use of any other form of lens, and with the additional advantage in so doing that the magnified printed matter is rendered readable at a substantial distance therefrom with ease, from any position in front thereof.

My invention is not limited to the use of a single magnifying lens, for it should be understood to include any number of lenses located in the path of the tape passing from the ticker, and in this connection it is to be observed that when the tape is opposed to a lens, the surface of which is spherical, a track-way of some suitable construction may be provided for positively guiding the tape across the surface of the lens, and which in the meantime will prevent a lateral movement of the tape.

To these ends, the lens may be provided with a groove either depressed therein, or formed by parallel lines of beads raised from the surface, or by means of a suitable guide formed separate from the magnifying surface, and supported in its operative position by any devices suitable therefor.

As a means for illuminating the contents of the globe and the printed characters on the tape, there is inserted through the top of the casing 14, a lamp—preferably an electric lamp—15, provided with a reflector 16, for concealing the rays of light and which are concealed from the observer of the tape, which reflector is for concentrating and directing the rays against the printed surface of the tape.

Having described my invention, what I claim and desire to secure by Letters Patent is:

1. A telegraph register receiving and displaying apparatus comprising in combination, an automatically operated printing mechanism, a substantially opaque printing tape therefor, a magnifying lens, and means for directing the printed tape around a portion of the spherical surface of said lens.

2. A telegraph register receiving and displaying apparatus comprising in combination, an electrically operated printing mechanism, an opaque printing tape therefor, a magnifying lens, and means for moving the printed tape around a portion of the spherical surface of and in the immediate vicinity of the lens.

3. A telegraph register receiving and displaying apparatus comprising in combination, an automatically operated printing mechanism, a printing tape therefor, a magnifying lens having a convex surface, and means for directing the printed tape in contact with and across said convex surface.

4. A telegraph register receiving and displaying apparatus comprising in combination, an automatically operated printing mechanism, a printing tape therefor, a spherical magnifying lens, and means for directing the printed tape to contact with a substantial portion of and across said surface.

5. A telegraph register receiving and displaying apparatus comprising in combination, an automatically operated printing mechanism, a water magnifying lens, and means for directly conducting the printed tape during the printing thereon around a portion of the spherical surface of and to contact with said lens.

6. A telegraph register receiving and displaying apparatus comprising in combination, an electrically operated printing mechanism, a printing tape therefor, a spherical water magnifying lens, means for directing a substantial length of the printed tape to contact with and across a substantial portion of the surface of said lens, and a surface distant from the lens for receiving the magnified characters on the tape.

7. A telegraph register receiving and displaying apparatus comprising in combination, an electrically operated printing mechanism, a printing tape therefor, a wind-up reel for said tape, a magnifying lens located between said reel and printing mechanism, and means for conducting the printed tape concurrently with the printing thereon to said reel in direct contact with a substantial portion of the spherical surface of said lens.

In witness whereof I have hereunto set my hand this 9th day of February, A. D. 1918.

NATHANIEL B. CREGIER.

Witnesses:
A. F. MacLoane,
Jno. G. Elliott.